Aug. 19, 1958     L. BROWNSTEIN     2,847,954
METHOD AND APPARATUS FOR FORMING A CLOSED
LOOP OF TAPE THREADED THROUGH A BUCKLE
Filed Oct. 11, 1956     9 Sheets-Sheet 1

INVENTOR
LOUIS BROWNSTEIN.
BY 
ATTORNEY.

FIG. 14.

Aug. 19, 1958  L. BROWNSTEIN  2,847,954
METHOD AND APPARATUS FOR FORMING A CLOSED
LOOP OF TAPE THREADED THROUGH A BUCKLE
Filed Oct. 11, 1956  9 Sheets-Sheet 5

INVENTOR
LOUIS BROWNSTEIN.
BY 
ATTORNEY.

INVENTOR
LOUIS BROWNSTEIN.
BY
ATTORNEY.

Aug. 19, 1958  L. BROWNSTEIN  2,847,954
METHOD AND APPARATUS FOR FORMING A CLOSED
LOOP OF TAPE THREADED THROUGH A BUCKLE
Filed Oct. 11, 1956
9 Sheets-Sheet 8

INVENTOR
LOUIS BROWNSTEIN.
BY
ATTORNEY.

INVENTOR
LOUIS BROWNSTEIN.
BY
ATTORNEY.

United States Patent Office 2,847,954
Patented Aug. 19, 1958

2,847,954

METHOD AND APPARATUS FOR FORMING A CLOSED LOOP OF TAPE THREADED THROUGH A BUCKLE

Louis Brownstein, Brooklyn, N. Y.

Application October 11, 1956, Serial No. 615,327

22 Claims. (Cl. 112—2)

This invention relates to the threading of buckles, and is a continuation-in-part of my pending application filed July 5, 1955, bearing Serial No. 519,785 and which has matured into Patent No. 2,770,204, granted November 13, 1956.

The apparatus and method of my invention described in my said prior application are directed to the threading of a short section of tape through a buckle frame, and thereafter folding said threaded tape rearwardly and sewing the adjacent branches thereof together to form a loop. In the practice of my present invention, as well as that of the said prior application, it is preferred, although not necessary, to perform the threading and looping operations upon a buckle frame the forward portion of which has previously been automatically threaded by the apparatus and method of my invention described in my Patent No. 2,715,984, issued August 23, 1955.

It is one of the objectives of the present invention to improve upon that of my said prior application by enabling the rearwardly extending branches of the threaded tape to be sewed together either in perfect coincidental overlapping relation, or in relative angular relation, as is frequently required in buckle assemblies employed in brassieres and other garments. And in said last-mentioned aspect of my invention it is a further objective to enable said branches to be folded and sewed together in various selected relative angular positions.

Another object of my invention is to provide positive and effective retracting means for folding back the said two branches of the threaded tape into selected relative positions, and to maintain said branches in said positions both during the folding and subsequent sewing operations. And in said last-mentioned aspect of my invention, it is a further object to provide automatically operated holding means releasably engageable with the tape during said folding and sewing operations.

It is further within my contemplation to provide an automatic mechanism in which various steps are performed in predetermined sequence and timed relationship, such steps including the feeding of the buckle and the threading thereof (both substantially as performed according to the teaching of my said prior application), the retracting and folding step, and the holding and sewing steps.

It is also my objective to provide a relatively simple and unitary machine capable of being operated by a single operator, and whereby the steps of selectively positioning the two branches of the tape, and of holding and sewing same, are performed in coactive relation to the steps performed by the mechanism of said parent application and that of said Patent No. 2,715,984.

Other objects, features and advantages will appear from the drawings and the description hereinafter given.

Referring to the drawings,

Figures 1 to 5 are fragmentary perspective views showing successive relative positions of a previously front-threaded buckle and a short rear tape in the sequence of operations performed by the method of my invention by which the two branches of the tape are brought into coincidental overlapping relation.

Figures 1, 2, 3:
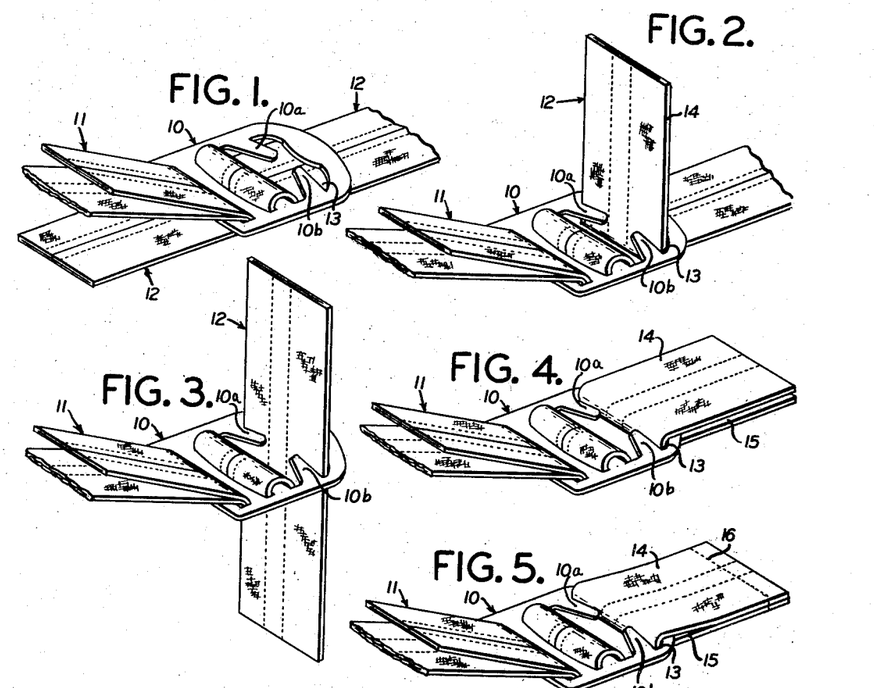
Figures 6, 7:
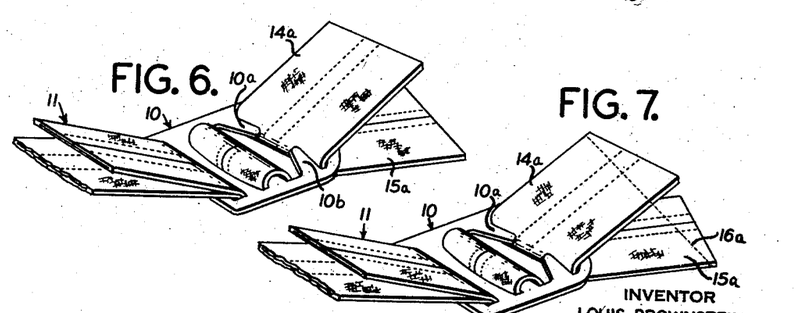
Figure 6 is a perspective view substantially like Fig. 4, showing the two branches of the tape in angular overlapping relation, before being sewed together.
Figure 7 is a view like Fig. 6, the line of stitches extending across both of such branches.

Referring to Figs. 1 to 7, the buckle 10 and the front tape section generally designated 11 interthreaded with the buckle constitute an assembly produced by the method and apparatus of my invention described in said Patent No. 2,715,984. By a buckle-feed mechanism referred to in both said patent and said patent application, the assembly of buckle 10 and front tape 11 is advanced progressively along the apparatus constituting the subject matter of this invention until a point is reached in line with the feeding path of tape 12, this being the short rear tape for threading through the rear slot 13 of the buckle, as shown in Figs. 2 and 3. By the method of this invention, this latter tape is folded back to form two rearwardly extending branches 14 and 15 (Fig. 4), or 14a and 15a (Fig. 6). In the assembly of Figs. 4 and 5 the said branches 14 and 15 are shown in coincidental overlapping relationship, and joined together by a line of stitching 16. In the assembly of Figs. 6 and 7, the branches 14a and 15a are shown in divergent relation, these being secured together by line of stitching 16a. The respective completed assemblies are illustrated in Figs. 5 and 7.

Figures 8, 9, 10, 11, 11A, 12, 13, 17:
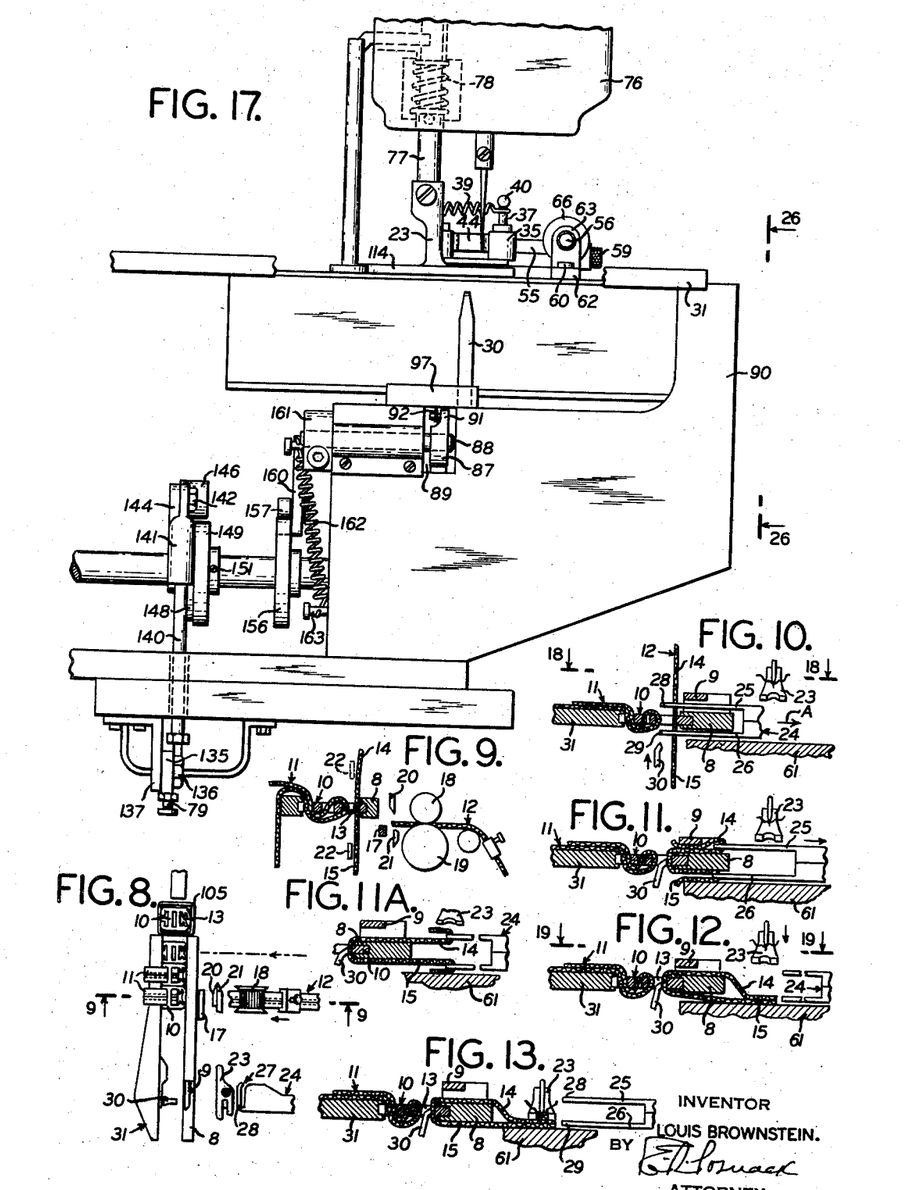
Figure 8 is a schematic plan view of certain portions of the apparatus of my invention, showing the buckle magazine, a completely threaded buckle, two buckles threaded with front tapes by the apparatus described in said patent, the most advanced buckle being positioned at the station for receiving the second or short rear tape by a feed directed toward said station, the view also showing the relative positions of the presser foot, the retracting member and the holding finger.
Figure 9 is an enlarged fragmentary section of Fig. 8 taken substantially along line 9—9 thereof, showing the blades of the cutting mechanism separated to permit the passage of a short tape therethrough, an operatively cut tape section being shown extending vertically through the rear slot of the buckle, the pusher blade being shown by full lines in its lower limiting position and by dot-dash lines in its upper limiting operative position.
Figure 10 is a section substantially like Fig. 9, with the buckle at the folding station, the retractor member being shown operatively engaging the short tape just prior to the folding operation.
Figure 11 is a view like Fig. 10, showing the beginning of the folding operation.
Figure 11a is a view like Fig. 11, showing a more advanced position of the folding step, and illustrating the spaced parallel relation of the two rearwardly extending branches of the tape.
Figure 12 is a view like Fig. 11, showing the end of the folding operation.
Figure 13 is a view like Fig. 12, showing the presser foot during a sewing operation upon the overlapping branches of the tape.
Figure 17 is a fragmentary side elevation of the apparatus of my invention, looking in the direction of arrows 17—17 of Fig. 14.
Figure 14:
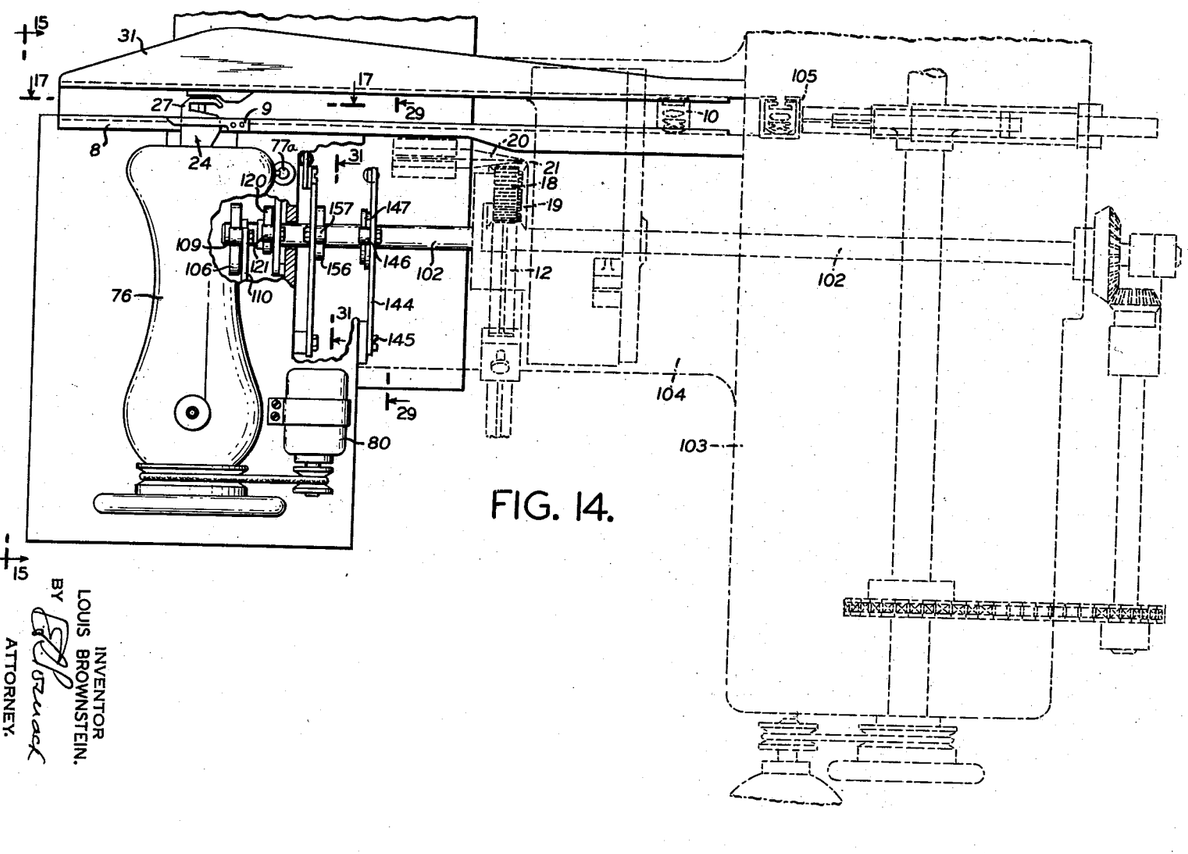
Figure 14 is a plan view of the apparatus constituting the present invention, fragments being broken away for clarity, the dot-dash portion representing sections of my apparatus described in the said parent application and in said patent.
Figure 18:
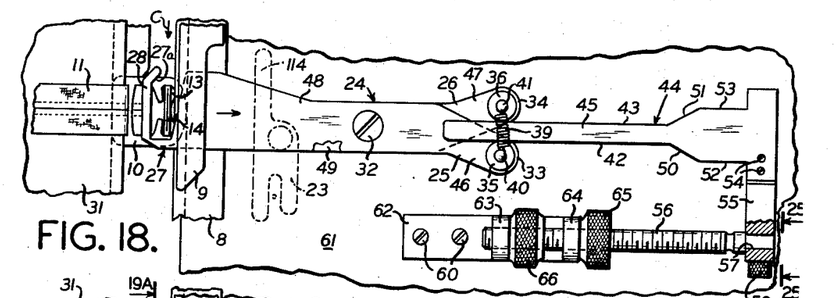
Figure 18 is a fragmentary plan view of the apparatus showing the retracting members in position prior to the beginning of the folding operation, said view being taken looking in the direction of arrows 18—18 of Fig. 10, the retractor member being set for folding the tape branches in coincidental overlapping relation, the presser foot being shown in dot-dash lines.

By referring to Figs. 8 and 9 it will be seen that the line of feed of the tape 12 is over the supporting bar 17 and underneath the buckle 10, the feeding being effected by the rollers 18 and 19, and the cutting operation by the coacting blades 20 and 21, in a manner described in said parent application Serial No. 519,785. When the tape 12 is disposed below the buckle, in the position illustrated in Fig. 1, the pusher blade 22 (Fig. 9) is actuated upwardly to the dot-dash position shown, thereby pushing the upper branch portion 14 of the tape through the said rear slot 13, all in a manner described in said parent application. Thereafter, by the feed-mechanism also described in said application, the assemblies of buckle and tapes are further advanced until they are respectively brought into operative alignment with the presser foot 23 of the sewing machine (to be hereinafter referred to), said presser foot being in substantial alignment with the path of the retractor device 24 (Figs. 8 and 18). As will more clearly hereinafter appear, said retractor device consists of two coacting retractor components, the bars 25 and 26, said components each having at the front thereof a hook generally designated 27 containing a slotted portion 27a positioned and proportioned to receive the tape section 12. The upper component 25 contains a finger 28 adapted to engage the said upper branch 14 of the tape 12—the lower component 26 having a finger 29 adapted to engage the lower branch 15 of said tape (Figs. 10 and 18). Thereafter the retractor member 25 is moved rearwardly in the direction of arrow A (Fig. 10) whereby the said fingers 28 and 29 engage and move the said upper and lower branches 14 and 15, respectively, rearwardly, as illustrated in Figs. 11 and 12. During such movement, the said upper branch 14 is slipped below the upper tape guide 9 spaced above said upper retractor bar 25, the lower tape branch 15 sliding over the machine top plate 61 which is spaced below the buckle track 8. It is this operation which effects the rearward folding of the tape.

At some intermediate position, as illustrated in Fig. 11, the tape holder 30 is brought up from its retracted position shown in Fig. 10 to its operative position shown in Figs. 11 and 12, to frictionally hold the tape against movement, so that there will be no slipping of the tape outwardly from the buckle. At the position illustrated in Fig. 13, the presser foot 23 is operatively actuated downwardly, to bring the two branches 14 and 15 of the tape into engagement; and just about this time—or if desired, slightly therebefore—the holder 30 is retracted from its operative position. Thereafter the sewing operation takes place. It is after this operation is completed that the buckle assembly, with the completed loop, is ejected from the track 8 and front tape-supporting platform 31 by the continued buckle-feeding operation above mentioned.

Figs. 18 to 25 illustrate the details of construction of the retractor member 24 and the adjusting mechanism therefor. The said two components 25 and 26 of the retractor member are pivotally mounted on the screw 32, the respective terminals 33 and 34 of said components carrying the respective rollers 35 and 36 mounted over the respective posts 37 and 38 supported by said terminals 33 and 34. Anchored on both of said posts is the spring 39 urging the rear arms 46 and 47 of the retractor member toward each other, the knobs 40 and 41 on top of said posts serving to retain said spring against detachment. The innermost positions of said rollers 35 and 36 are determined by the respective flat sides 42 and 43 of the cam member 44, said sides 42 and 43 being parallel to each other and constituting the lateral surfaces of the front bar 45 of said cam member, said bar extending longitudinally in a direction along a line through the center of pivot screw 32 and in the general direction of the longitudinal extent of the buckle 10. In the preferred form of my invention, the said rear arms 46 and 47 of the retractor components 25 and 26 are in angular relation to each other; and the forward arms 48 and 49 of said components are in coincidental relationship when said rollers 35 and 36 are in abutment with said respective sides 42 and 43. The said cam member 44 has the rearwardly divergent cam faces 50 and 51 thereon connecting the respective sides 42 and 43 and the rear parallel sides 52 and 53.

The cam member 44 is attached by screws 54 to a bracket 55 which carries the threaded adjusting rod 56 in spaced parallel relation to the longitudinal extent of said cam member 44. In the specific structure illustrated, the rear terminal of threaded rod 56 is held clamped within the aperture 57 of bracket 55 (Figs. 18 and 25), the terminal portion of said bar having a split portion 58 communicating with said aperture 57, the screw member 59 extending through said split portion and into the body of bracket 55 to hold the rod 56 gripped against displacement, in known manner. Affixed by fasteners 60 to the top plate 61 of the structure is the bracket 62 having two bearings 63 and 64 extending upwardly therefrom and adapted to support and slidably accommodate therein the said threaded rod 56 (see Figs. 18, 24 and 15). Mounted over and in threaded engagement with said rod 56 are the two knurled hand-manipulable nuts, the lock nut 65 and the adjusting nut 66, these nuts being in abuttable engagement with said bearings 63 and 64, as will hereinafter appear.

The arrangement is such that if it is desired, for purposes to be hereinafter set forth, to vary the distance between the cam member 44 and the pivot screw 32, this procedure may be followed: Lock nut 65 is rotatably retracted until it is free of said bearing 64. If it is desired to move cam 44 toward the right, the adjusting nut 66 is rotatably brought into engagement with bearing 63, the operative rotation being continued in a clockwise direction (looking to the left, Figs. 15 and 18), thereby causing the rod 56, as well as the associated cam 44, to move to the right; and thereafter the lock nut 65 is rotated and brought into engagement with the bearing 64, to lock the rod 56 and associated parts against movement. If it is desired to move the cam 44 to the left, the nut 65 is retracted in the manner aforesaid, and nut 66 rotatively brought into engagement with bearing 64, a continued rotation of adjusting nut 66 in a counter-clockwise direction (looking left) causing the rod 56 and associated parts to move to the right.

As will hereinafter appear, the position of cam member 44 in relation to pivot 32 determines whether the overlapping branches of the tape 12 are coincidental, or are in predetermined relative divergent positions.

Figures 15, 16:
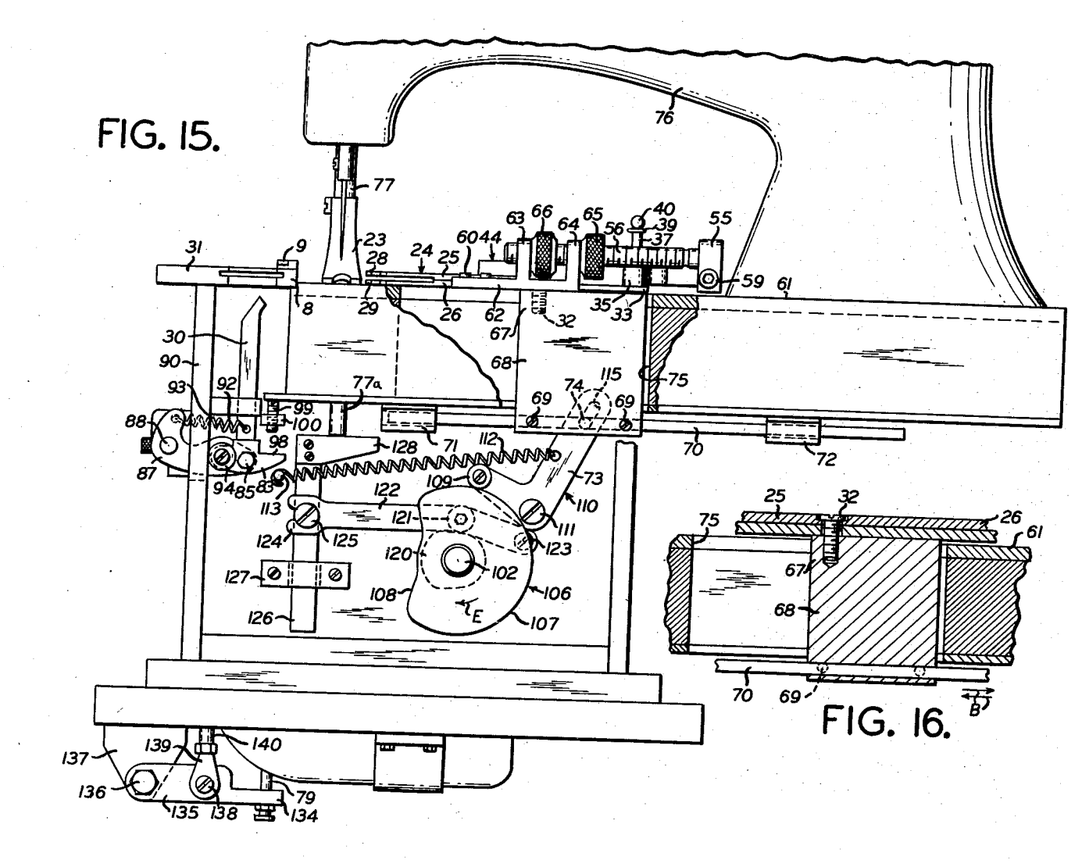
Figure 15 is a front elevation of the machine, looking in the direction of arrows 15—15 of Fig. 14, fragments being broken away for clarity, the retracting member being shown in position just prior to the sewing operation.
Figure 16 is a fragmentary vertical section of the retractor-operating mechanism, the section being taken substantially a long line 16—16 of Fig. 19.
Figure 19:
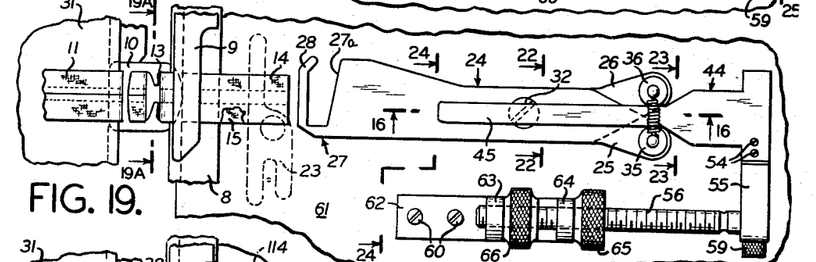
Figure 19 is a view similar to Fig. 18 looking in the direction of arrows 19—19 of Fig. 12, the branches being shown in operatively coincidentally overlapping positions, preparatory to the sewing operation.
Figure 19A:
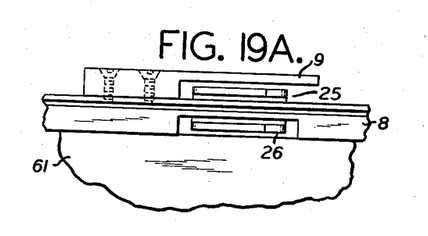
Figure 19a is a section of Fig. 19 taken along line 19a—19a, the buckle and tape having been removed for clarity.

By referring to Figs. 15 and 16 it will be seen that the said pivot screw 32 extends through both components 25 and 26 of the retractor member 24 and is in threaded engagement with the upper portion 67 of the slide block 68 attached by fasteners 69 to the square rail 70 slidably extending through the bearing brackets 71 and 72. A bellcrank arm 73 (to be hereinafter described) is in operative engagement with the pin 74 extending from said block 68, so that the operative rocking movement of said arm 73 will cause said block 68 to move forwardly and rearwardly in the directions of arrows B (Fig. 16)—said movement being possible because the slotted portion 75 of plate 61 slidably accommodates the upper portion 67 of the slide block 68. Since the block 68 carries the pivot screw 32, the operative movement of this block causes the entire retractor assembly 24 to move forwardly and rearwardly to opposite limiting positions determined by the stroke of block 68. In its foremost limiting position the retractor member 24 is disposed as indicated in Fig. 18, in a position to receive the upstanding tape (as per Fig. 3) traveling in the direction of arrow C. As the retractor member 24 is moved rearwardly, by the above-described action of block 68, the rollers 35 and 36 are maintained in engagement with the said flat sides 42 and 43 of the relatively thin bar 45 of the cam member 44. When the adjusting mechanism is set as illustrated in Figs. 18 and 19, the rearmost position of the retractor member 24 is such that the rollers 35 and 36 are still in engagement with said sides 42 and 43, since their final rearward position is short of the sloping cam faces 50 and 51 of the cam member 44. Hence, the said forward arms 48 and 49 of the retractor member have, throughout the entire operative stroke thereof, remained in parallel coincidental relation, thereby guiding and maintaining said branches 14 and 15 of the tape in similar parallel overlapping coincidental positions. The rearward operative motion of the retractor member 24 merely causes the said branches 14 and 15 of the tape to slidably move along the respective fingers 28 and 29 of the retractors, said branches becoming disengaged from the fingers when the retractors reach their rearmost positions.

Figure 20:
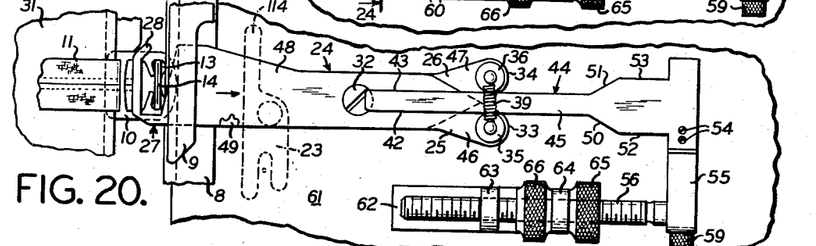
Figure 20 is a view substantially like Fig. 18, but showing the retractor member set for performing a folding operation with the tape branches in their maximum angular relation.
Figures 21, 22:
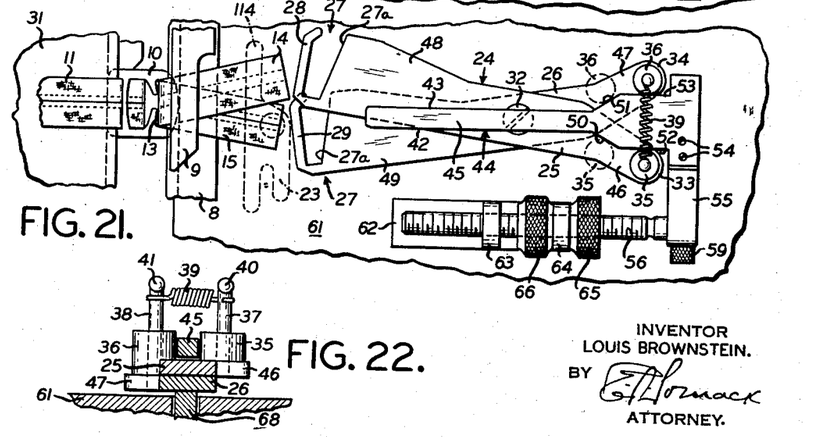
Figure 21 is a view like Fig. 20, showing the position of the tape and retractor member at the rear portion of the latter's operative stroke.
Figure 22 is a section of Fig. 19 taken along line 22—22.
Figure 23:
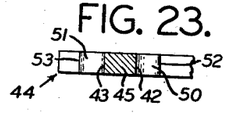
Figure 23 is a section of Fig. 19 taken along line 23—23.
Figure 24:
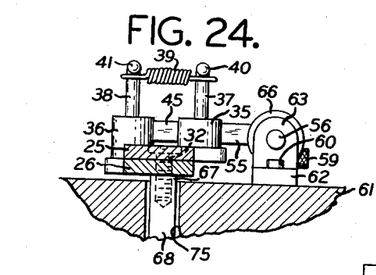
Figure 24 is a section of Fig. 19 taken along line 24—24.
Figure 25:
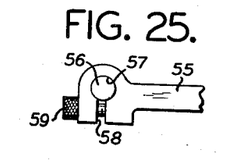
Figure 25 is a fragmentary rear view of Fig. 18, looking in the direction of arrows 25—25.

If it is desired to arrange the said branches of the tape in their maximum divergent relative positions, the screws 65 and 66 are manipulated to the positions shown in Figs. 20 and 21, so that in the final rearmost position said rollers 35 and 36 are disposed against the faces 50 and 51 of the cam member 44. Since these faces are farther apart than faces 42 and 43, it is obvious that the rollers 35 and 36 will be correspondingly separated, to cause a pivotal movement of said retractor components 25 and 26 about pivot screw 32, to the position illustrated in Fig. 21. In this position the rearwardly extending branches of the tape are in divergent relation, like the branches 14a and 15a of Fig. 6. Should it be desired to have said branches of the tape assume relative intermediate angular positions, it is obvious that the nuts 65 and 66 can be manipulated to such relative positions on the threaded rod 56 so that the final rearmost position of the rollers 35 and 36 will be disposed on the sloping cam faces 50 and 51, as shown by the dot-dash circles in Fig. 21.

After the completion of the retracting and folding operation above described, the sewing operation occurs. The sewing machine 76 contains therein the presser foot rod 77 supporting the presser foot 23, said rod 77 being actuated by a cam mechanism to be hereinafter described. Suffice it to say for the present that said rod 77 is urged downwardly into its operative position by the spring 78 disposed within the head of the sewing machine (Figs. 27 and 28), the cam mechanism being adapted to urge the rod 77 and the presser foot 23 upwardly against the action of said spring. The mechanism is so timed that the presser foot 23 is brought into engagement with the overlapping branches 14 and 15 (or 14a and 15a) after the above-mentioned rearmost retraction of the retractors; and thereafter the sewing machine is set into operation by the operative movement of sewing-machine motor switch button 79 (Fig. 29) by a cam mechanism to be hereinafter described. Said switch is operatively connected to the motor 80 operating the sewing machine 76, the details of the switch, motor and circuit not being shown, since these are well known by persons skilled in the art, a detailed description thereof not being necessary for an understanding of the present invention. In the apparatus illustrated, when the switch button 79 is pushed in, the motor is in operation, and when retracted, the motor is inoperative. The timing is such that the machine will perform its sewing operation in predetermined coactive relation with the actuation of said presser foot 23. There is a cam adjustment, to be hereinafter described, wherein the period of the sewing operation may be varied, since less stitching time is required to sew the coincidental branches 14 and 15, than the divergent branches 14a and 15a.

As aforesaid, the holder member 30 is brought into engagement with the tape section during the folding operation of said retractor member 24; and the engagement is maintained until the sewing operation is about to begin. As will be seen from Figs. 32 to 37, the holding member 30 comprises an upper tip portion 81 which is shaped to engage the foremost or apical portion 82 of the tape section 12—said tip portion 81 being sufficiently small to enter the transverse slot 13 of the buckle, preferably between the inwardly extending arms 10a and 10b of the buckle (see Fig. 1). The said holding member 30 is supported by the pivotal mounting 83, the latter having a forwardly extending extension 84. The mounting has a pin 85 extending through the adjacent rearwardly extending arm 86 of the bellcrank 87, the latter being fixedly mounted on shaft 88 operatively actuated by a cam mechanism to be hereinafter described. The said arm 86 of bellcrank 87 extends through the apertured portion 89 of the wall 90, said bell-crank also having an upwardly extending arm 91 connected to the holding member 30 by the tension spring 92. The inner portion of said wall 90 contains thereon a guiding and tipping cam 93 formed to receive thereagainst the peripheral surface of the roller 94 rotatably mounted on the pin 95 carried by said extension 84. The holding member 30 extends through the apertured portion 96 of the plate 97 attached to wall 90. The said mounting 83 has a rearwardly protruding lip 98 disposed below the adjustably positioned stop stud 99 in threaded engagement with the internally threaded lug 100 attached to the apparatus.

Figure 34:
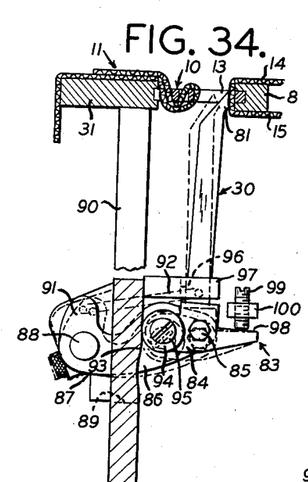
Figure 34 is a view substantially like Fig. 33, showing the holder member in its operative position, the dot-dash lines showing the position of the finger just prior to its being moved to its said operative position.

The arrangement is such that upon a counterclockwise rotation of shaft 88 in the direction of arrow D, the bellcrank will be correspondingly rotated; and because of the pivotal connection at 85 between arm 86 of the bellcrank and the mounting 83, the latter will be urged upwardly to the position illustrated in Fig. 34. When the roller 94 reaches the high point or crest 101 of cam 93, the mounting 83—under the continued influence of the rotating bellcrank 87—will be rotatably urged slightly in a clockwise direction, the rotation occurring around pivot 85, thereby causing a slight rearward tipping of the holding member 30 toward the tape 12 to the position indicated by the dot-dash lines of Fig. 35. A continued rotation of bellcrank 87 in the direction of arrow D (Fig. 33) will bring lip 98 into abutment with the stop screw 99; and as the bellcrank continues to rotate, the mounting 83 will rotate in a clockwise direction about pivot 85, to bring the tip 81 of the holder into engagement with that portion of the tape 12 disposed within buckle 10. This occurs against the action of said spring 92.

Figure 35:
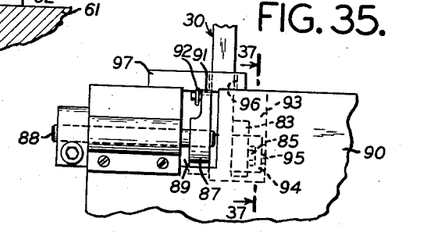
Figure 35 is a fragmentary elevational view of Fig. 32, looking in the direction of arrows 35—35.
Figure 36:
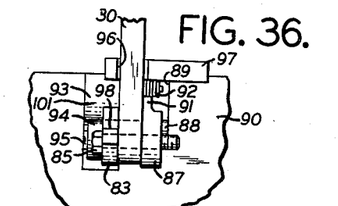
Figure 36 is a fragmentary elevational view of Fig. 32, looking in the direction of arrows 36—36.
Figure 37:
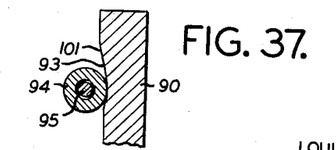
Figure 37 is a vertical section of Fig. 35 taken substantially along line 37—37.

As will hereinafter appear, the bellcrank 87 is maintained in the position illustrated in Fig. 35 for a sufficient time to permit the holder 30 to perform its engaging and holding operation. The cam-operating shaft 88 will thereafter cause it to rotate in a clockwise direction (opposite to direction D), thereby to lower arm 86; whereupon the spring 92 will retract holder member 30; and thereafter, a continued clockwise rotation of bellcrank 87 will return the mounting 83 and the holder 30 to the retracted position illustrated in Fig. 33.

It is thus apparent that a gradual and gentle movement of the holder member 30 is effectuated to maintain the tape 12 against displacement. Should it be deemed necessary to adjust the time of contact with the tape, an operative rotation of screw 99 within lug 100 will either advance or retard the time of contact of lip 98 with stud 99, and thereby correspondingly vary the time of engagement of tip 81 with the tape 12.

The actuation of the retractor member, presser foot, motor switch and holding member is effectuated through camming mechanisms operatively associated with shaft 102 extending through the casings 103 and 104 housing mechanism described in my said Patent No. 2,715,984 and said parent application Serial No. 519,785. A description of the mechanism for operating shaft 102 will not be repeated herein, since it is described in said patent, which also describes the coactive operation of the buckle-pusher member operatively associated with the buckle magazine 105. Operatively associated with shaft 102 is also the camming mechanism for actuating the feed for the tape 12, as well as the blades 20 and 21 of the cutting mechanism, both described in the said parent application.

Figure 26:
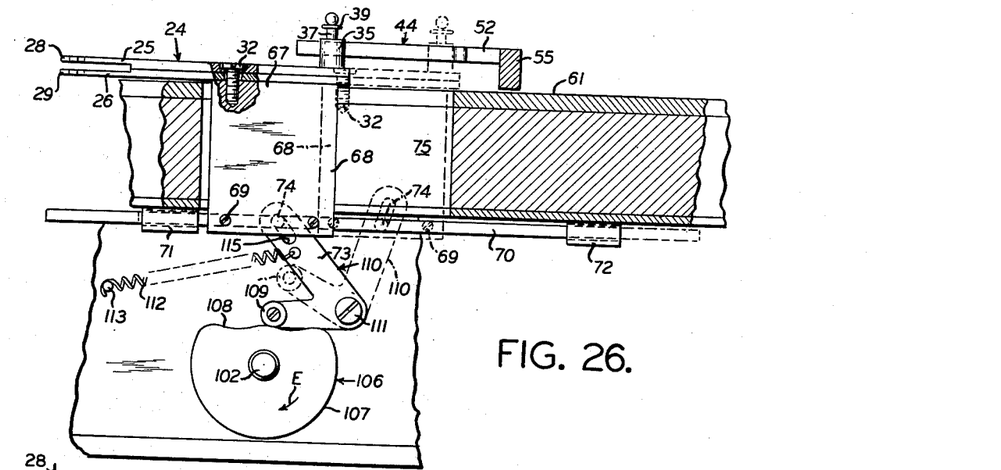
Figure 26 is a fragmentary elevational view looking in the direction of arrows 26—26 of Fig. 17, shown partly in section, and illustrating part of the retractor mechanism shown in Figs. 15 and 16.

By referring to Figs. 15 and 26, it will be seen that fixedly mounted on shaft 102 is the cam 106 having thereon the elevating surface 107 and the lowering surface 108. The roller 109, rotatably attached to a terminal of the bell-crank follower 110, which is pivotally mounted at 111, is maintained in engagement with the operative cam surfaces of cam 106 by the spring 112 anchored to the structure at 113 and attached to said arm 73 of said follower 110. The upper portion of arm 73 has a slotted portion 115 through which extends the said pin 74 attached to the block 78. When said shaft 102 rotates in the direction of arrow E, it is apparent that the arm 73 of the follower will be rocked between foremost and rearmost limiting positions, the foremost position being that at which the retractor member 24 is in the position to receive the tape, and the rearmost position is that in which the retractor is maintained while the sewing operation takes place. It will be observed from the cam-timing diagram in Fig. 38 that the retractor begins to move from its foremost position 116 after the buckle feed has been completed at point 117, the retractor reaching its rearmost position at 118 and remaining there during the time interval represented by the line 118—119, after which it is brought forward to its tape-receiving position. During said time interval between 118 and 119, the roller 109 is in engagement with said elevating surface 107.

Figure 27:
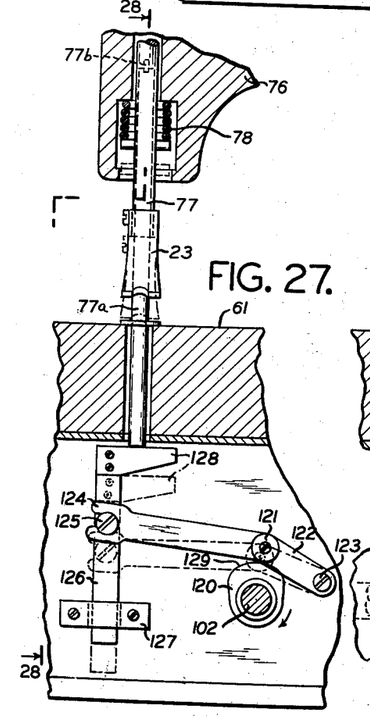
Figure 27 is a fragmentary elevational view, looking in the direction of arrows 26—26 of Fig. 17, the view being partly in section, and showing the presser foot and the cam-operating mechanism therefor, the presser foot being shown in full lines in its raised position, the dot-dash lines showing the presser foot and associated parts in sewing position.
Figure 28:
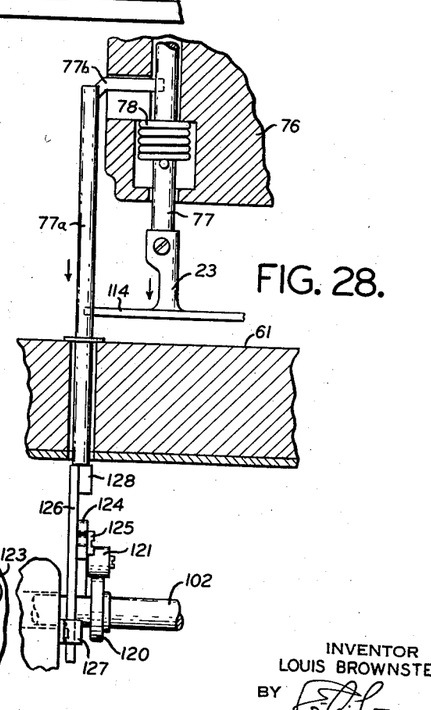
Figure 28 is a section of Fig. 27 taken substantially along line 28—28.
Figure 38:
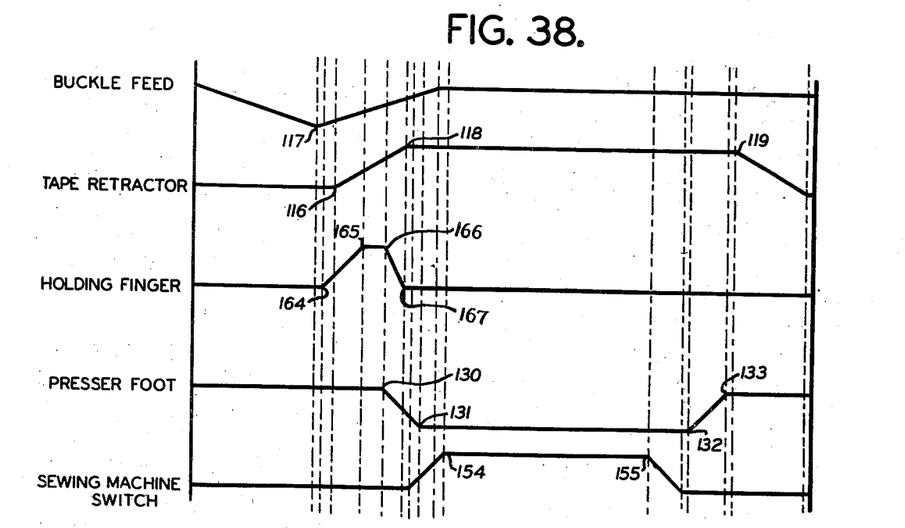
Fig. 38 shows cam-motion diagrams of the main operative components of the apparatus of this invention, illustrated to show the timed relation between the operative movements of said components.

By referring to Figs. 27 and 28 it will be seen that the said shaft 102 has fixedly mounted thereon the cam 120, the roller 121 affixed to the follower lever 122 being maintained in engagement with the peripheral surface of said cam 120 by the action of said spring 78. Said follower lever 122 is pivotally mounted at 123, the opposite bifurcated end 124 of said lever being in engagement with the headed pin 125 attached to the vertical presser foot bar 126. The latter is slidably mounted for movement through the bracket 127, the upper portion of said bar containing thereon the support 128 supporting the outer presser foot actuating rod 77a which is connected by member 77b to said presser foot rod 77. The arrangement is hence such that upon an operative rotation of shaft 102, said presser foot rod 77 and presser foot carried thereby will be moved upwardly into inoperative position when the roller 121 is in engagement with the high surface 129 of cam 120. The dot-dash position of the parts, as illustrated, shows the low or operative position of the presser foot and associated parts. The cam-timing diagram of Fig. 38 shows that the presser foot begins its descent at point 130, quickly reaching the operative position at 131 and being maintained in such position while the retractor member is in its rearmost position, the presser foot being elevated at point 132 to reach its maximum retracted position at 133 just about the time the retractor begins moving forwardly.

Figures 29, 30, 31:
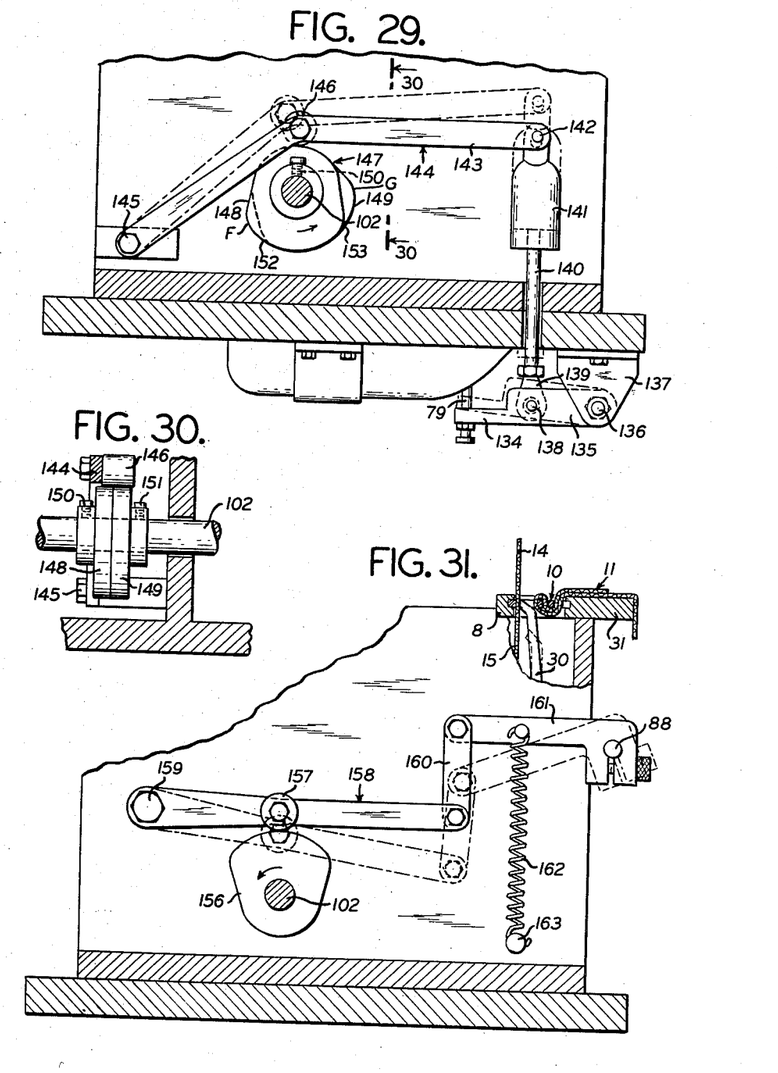
Figure 29 is a section taken substantially along line 29—29 of Fig. 14, showing the operating mechanism for the sewing-machine motor switch, the dot-dash lines showing the position of the switch and operating mechanism in the closed-switch position.
Figure 30 is a fragmentary section of Fig. 29 taken substantially along line 30—30 of Fig. 29.
Figure 31 is a fragmentary section taken substantially along line 31—31 of Fig. 14, showing the operating mechanism for the tape-holder member, the dot-dash lines showing the position of said mechanism and holder member when the latter is in its retracted position.

Fig. 29 shows in full lines the motor switch button 79 in its retracted position. Attached to said switch member 79 is the arm 134 of the lever 135 pivotally supported at 136 by the bracket 137. Pivotally connected at 138 to said lever 135 is the link 139 from which extends upwardly the rod 140 connected to weight 141. Pivotally connected at 142 of said weight is the arm 143 of the follower lever 144, the opposite terminal of which is pivotally supported at 145. The said follower lever 144 carries the roller 146 bearing against the operative surface of the combination cam 147, the latter being fixedly mounted upon the shaft 102.

In the particular construction illustrated, combination cam 147 consists of adjacent overlapping cams 148 and 149, maintained in selected positions by the set screws 150 and 151. If it is desired to have a high point of extended duration, at which the follower arm 144 will be at its elevated dot-dash position illustrated for an extended period of time (such as would be required if the stitching were to be performed across divergent branches 14a and 15a, Fig. 6), then the two cams 148 and 149 could be operatively positioned on the shaft 102 so that their combined outer operative surfaces 152 and 153 would together form an arc of extended length, substantially as indicated in Fig. 31, from point F to G. However, should it be desired to reduce the period of stitching to the minimum period possible with this structure, the two cams 148 and 149 could be positioned so that the said operative surfaces 152 and 153 are in substantial registry. In either event, the roller 146 is sufficiently wide to extend across or at least simultaneously engage the cam surfaces of both of said cams 148 and 149. When the roller reaches the illustrated low point of the combination cam 147, the weight 141 will bear downwardly upon the mechanism, and cause the lever 144 to be pivotally lowered, and thereby bring the switch member 79 to its open position. It will be noted from Fig. 38 that the stitching operation begins at point 154 and ends at 155, a time interval somewhat less than the duration of the engagement of the presser foot with the work.

Figure 32:
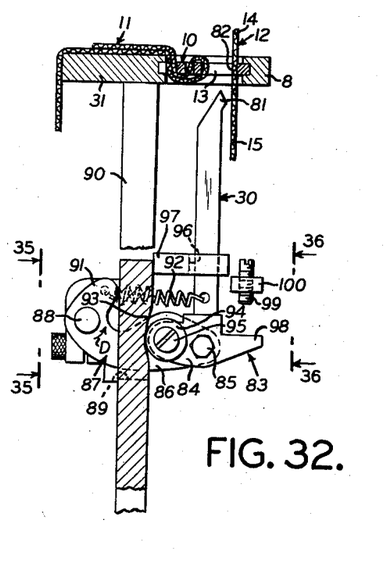
Figure 32 is an elevational view, shown partly in section, of the tape-holder operating mechanism, the view being taken looking substantially in the direction of arrows 26—26 of Fig. 17, the tape-holder member being shown in its retracted inoperative position.
Figure 33:
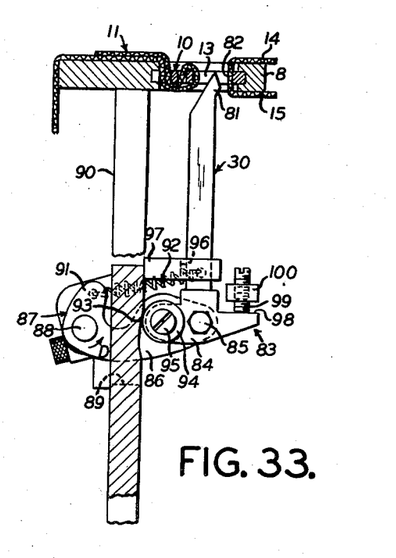
Figure 33 is a view substantially like Fig. 32, showing the operating mechanism and holder member in an operatively raised position.

Fig. 31 shows the cam 156 mounted upon shaft 102, the roller 157 of follower arm 158 being in engagement with the operative surface of said cam. Said arm 158 is pivotally mounted at 159, and at the opposite end is pivotally connected to the link 160 at one end thereof, the opposite end of link 160 being connected to actuator arm 161 clamped onto shaft 88 upon which the said bellcrank 87 (Fig. 33) is fixed. The spring 162, anchored at 163, is connected to arm 161 and urges it downwardly, whereby the roller 157 is in yieldable pressing engagement with the operative surface of cam 156. The dot-dash lines represent the parts in their lowered position when the roller 157 is in engagement with the low point of the cam, during which time the holding member 30 is maintained in its lower position, as illustrated in Fig. 32. It will be seen from the cam-timing diagram of Fig. 38 that the movement of the holding finger begins at point 164 and reaches its engaging position at point 165, where it is held until point 166, whereafter it is released until the finger reaches its retracted position at point 167. It will be noted that the engaging point 165 is after point 116, indicating that it is only after the retractor has begun its retracting or folding operation that the holding finger is brought into engagement with the tape. Releasing point 166 of the holding finger is to the left of point 131, showing that it is released, in this preferred form of operation, before the sewing operation is performed and before the presser foot, with its supplementary foot 114 (for engaging divergent tape branches) is in operative engagement with the tape.

From the above description it is apparent that this invention is adapted for coactive use with my prior inventions as described in the said parent application Serial No. 519,785 and the said Patent No. 2,715,984, whereby a buckle previously threaded can be carried into the mechanism of my present invention without interruption, and whereby a short section of tape, fed and cut in accordance with my invention described in said application, can be directed to the sewing station, folded backwardly in either coincidental or angular branch relationship, to have a sewing operation performed thereon.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In an apparatus for forming a closed loop of a length of tape extending through a transverse slot of a buckle with branches of the tape disposed on opposite sides of the buckle, the combination of a support for said buckle, whereby said branches extend on opposite sides of said support, a retractor member movable between forward and rear limiting positions along a path extending longitudinally of the buckle, said retractor member having two fingers positioned in planes adjacent the opposite faces of the buckle and disposed forwardly of said branches when the retractor member is in its said forward limiting position, said fingers being slidably engageable with said branches upon an operative movement of the retractor member rearwardly from said forward position to said rearward limiting position, thereby to fold said branches, rearwardly, a sewing machine in overlying relation to said path and positioned for operative engagement with said tape branches when they are operatively in their respective folded-back positions, and means to actuate said retractor member and said sewing machine.

2. In an apparatus for forming a closed loop of a length of tape extending through a transverse slot of a buckle with branches of the tape disposed on opposite sides of the buckle, the combination of a track for slidably supporting said buckle with said branches extending on opposite sides of said track, means to move said buckle along said track, a portion of said track constituting a folding and sewing station, a retractor member movable between forward and rear limiting positions along a path extending longitudinally of the buckle when at said station, said retractor member having two hooked portions positioned in planes adjacent the opposite faces of the buckle when at said station, said hooked portions being disposed at said station and in respective positions to receive said branches when the retractor member is in its said forward limiting position, said hooked portions being slidably engageable with said branches upon an operative movement of the retractor member rearwardly from said forward position to said rearward limiting position, thereby to fold said branches rearwardly, a sewing machine in overlying relation to said path and positioned for operative engagement with said tape branches when they are operatively in their respective folded-back positions, and means to actuate said retractor member and said sewing machine.

3. In an apparatus for forming a closed loop of a length of tape extending through a transverse slot of a buckle with branches of the tape disposed on opposite sides of the buckle, the combination of a support for said buckle, whereby said branches extend on opposite sides of said support, a retractor member movable between forward and rear limiting positions along a path extending longitudinally of the buckle, said retractor member having two fingers positioned in planes adjacent the opposite faces of the buckle and disposed forwardly of said branches when the retractor member is in its said forward limiting position, said fingers being slidably engageable with said branches upon an operative movement of the retractor member rearwardly from said forward position to said rearward limiting position, thereby to fold said branches rearwardly, a tape-holding member operatively movable between a projected position in engagement with the portion of said tape within said buckle slot and a retracted position out of engagement therewith, a sewing machine in overlying relation to said path and positioned for operative engagement with said tape branches when they are operatively in their respective folded-back positions, and means to actuate said retractor member, said sewing machine, and said tape-holding member.

4. In an apparatus for forming a closed loop of a length of tape extending through a transverse slot of a buckle with branches of the tape disposed on opposite sides of the buckle, the combination according to claim 1, said retractor member comprising two bars to the forward portions of which the said retractor fingers are joined, said forward portions being in mutually spaced relation and straddling said buckle support when the retractor member is in said forward limiting position.

5. In an apparatus for forming a closed loop of a length of tape extending through a transverse slot of a buckle with branches of the tape disposed on opposite sides of the buckle, the combination according to claim 1, said retractor member comprising two bars to the forward portions of which the said retractor fingers are joined, said forward portions being in mutually spaced relation and stradlling said buckle support when the retractor member is in said forward limiting position, said bars also being movable laterally with respect to each other, whereby said tape branches operatively engaged by said fingers will be correspondingly moved laterally, and means to actuate said bars laterally.

6. In an apparatus for forming a closed loop of a length of tape extending through a transverse slot of a buckle with branches of the tape disposed on opposite sides of the buckle, the combination according to claim 1, said retractor member comprising two pivotally connected bars to the forward portions of which the said retractor fingers are joined, said forward portions being in mutually spaced relation and straddling said buckle support when the retractor member is in said forward limiting position, and means to pivotally actuate said bars to cause a lateral separation of their said forward portions, whereby said tape branches operatively engaged by said fingers will be correspondingly moved laterally.

7. In an apparatus for forming a closed loop of a length of tape extending through a transverse slot of a buckle with branches of the tape disposed on opposite sides of the buckle, the combination according to claim 1, said retractor member comprising two pivotally connected bars to the forward portions of which the said retractor fingers are joined, said forward portions being in mutually spaced relation and straddling said buckle support when the retractor member is in said forward limiting position, a pivot screw connecting said bars intermediate their respective ends, said screw being movable in the direction of the said path between forward and rear limiting positions, said retractor-actuating means being operatively connected to said screw, and cam means positioned for engagement with said bars when they are in a predetermined rear position and proportioned to pivotally actuate said bars to cause a lateral separation of their said forward portions, whereby said tape branches operatively engaged by said fingers will be correspondingly moved laterally.

8. In an apparatus for forming a closed loop of a length of tape extending through a transverse slot of a buckle with branches of the tape disposed on opposite sides of the buckle, the combination according to claim 1, said retractor member comprising two pivotally connected bars to the forward portions of which the said retractor fingers are joined, said forward portions being in mutually spaced relation and straddling said buckle support when the retractor member is in said forward limiting position, a pivot screw connecting said bars intermediate their respective ends, said screw being movable in the direction of the said path between forward and rear limiting positions, said retractor-actuating means being operatively connected to said screw, and a cam member with two rearwardly divergent operative surfaces positioned to engage the rear portion of said bars when the retractor member is operatively moving rearwardly, thereby to pivotally actuate said bars and cause a lateral separation of their said forward portions, whereby said tape branches operatively engaged by said fingers will be correspondingly moved laterally.

9. In an apparatus for forming a closed loop of a length of tape extending through a transverse slot of a buckle with branches of the tape disposed on opposite sides of the buckle, the combination according to claim 1, said retractor member comprising two pivotally connected bars to the forward portions of which the said retractor fingers are joined, said forward portions being in mutually spaced relation and straddling said buckle support when the retractor member is in said forward limiting position, a pivot screw connecting said bars intermediate their respective ends, said screw being movable in the direction of the said path between forward and rear limiting positions, said retractor-actuating means being operatively connected to said screw, a cam member having an elongated forward portion extending substantially in the direction of said path, an expanded portion at the rear of said forward portion, and an intermediate cam portion, said elongated forward portion having two opposite front parallel lateral sides, said expanded portion having two opposite rear lateral sides a predetermined greater distance apart than said front lateral sides, and two rearwardly diverging lateral cam sides on said intermediate portion, and follower means at the rear of said respective retractor bars, said respective follower means being engageable with the said lateral sides of said front, intermediate and rear portions of said cam member.

10. In an apparatus for forming a closed loop of a length of tape extending through a transverse slot of a buckle with branches of the tape disposed on opposite sides of the buckle, the combination according to claim 1, said retractor member comprising two pivotally connected bars to the forward portions of which the said retractor fingers are joined, said forward portions being in mutually spaced relation and straddling said buckle support when the retractor member is in said forward limiting position, a pivot screw connecting said bars intermediate their respective ends, said screw being movable in the direction of the said path between forward and rear limiting positions, said retractor-actuating means being operatively connected to said screw, a cam member having an elongated forward portion extending substantially in the direction of said path, an expanded portion at the rear of said forward portion, and an intermediate cam portion, said elongated forward portion having two opposite front parallel lateral sides, said expanded portion having two opposite rear lateral sides a predetermined greater distance apart than said front lateral sides, and two rearwardly diverging lateral sides on said intermediate portion, follower rollers at the rear of said respective retractor bars and engageable with the said lateral sides of said front, intermediate and rear portions of said cam member, and spring means yieldably urging said follower rollers into engagement with said lateral sides.

11. In an apparatus for forming a closed loop of a length of tape extending through a transverse slot of a buckle with branches of the tape disposed on opposite sides of the buckle, the combination according to claim 1, said retractor member comprising two pivotally connected bars to the forward portions of which the said retractor fingers are joined, said forward portions being in mutually spaced relation and straddling said buckle support when the retractor member is in said forward limiting position, a pivot screw connecting said bars intermediate their respective ends, said retractor-actuating means having a block reciprocatingly movable in the direction of said path between forward and rear limiting positions, said pivot screw being attached to said block, and cam means positioned for engagement with said bars when they are in a predetermined rear position and proportioned to pivotally actuate said bars and thereby cause a lateral separation of their said forward portions, whereby said tape branches operatively engaged by said fingers will be correspondingly moved laterally.

12. In an apparatus for forming a closed loop of a length of tape extending through a transverse slot of a buckle with branches of the tape disposed on opposite sides of the buckle, the combination according to claim 1, said retractor member comprising two pivotally connected bars to the forward portions of which the said retractor fingers are joined, said forward portions being in mutually spaced relation and straddling said buckle support when the retractor member is in said forward limiting position, a pivot screw connecting said bars intermediate their respective ends, said screw being movable in the direction of the said path between forward and rear limiting positions, said retractor-actuating means being operatively connected to said screw, a cam member with two rearwardly divergent operative sides substantially in the lines of operative movement of said respective two bars, said cam member being movable forwardly and rearwardly relative to said buckle support, and releasable locking means to hold said cam member in a selected operative position, said divergent sides of the cam member being positioned and proportioned to engage said bars, when the cam member is in a predetermined operative position, during an operative retraction of said retractor member, thereby to pivotally actuate said bars and cause a lateral separation of their said forward portions, whereby said tape branches operatively engaged by said fingers will be correspondingly moved laterally.

13. In an apparatus for forming a closed loop of a length of tape extending through a transverse slot of a buckle with branches of the tape disposed on opposite sides of the buckle, the combination according to claim 1, said retractor member comprising two pivotally connected bars to the forward portions of which the said retractor fingers are joined, said forward portions being in mutually spaced relation and straddling said buckle support when the retractor member is in said forward limiting position, a pivot screw connecting said bars intermediate their respective ends, said screw being movable in the direction of the said path between forward and rear limiting positions, said retractor-actuating means being operatively connected to said screw, a cam member having an elongated forward portion extending substantially in the direction of said path, an expanded portion at the rear of said forward portion, and an intermediate cam portion, said elongated forward portion having two opposite front parallel lateral sides, said expanded portion having two opposite near lateral sides a predetermined greater distance apart than said front lateral sides, and two rearwardly diverging lateral sides on said intermediate portion, follower means at the rear of said respective retractor bars, said respective follower means being engageable with the said lateral sides of said front, intermediate and rear portions of said cam member, a movable mounting for said cam member, a threaded rod connected to said mounting, fixed bearing means slidably supporting said rod, a nut mounted on and in threaded engagement with said rod, said nut being engageable with said bearing means, whereby an operative rotation of said nut will cause a longitudinal movement of said rod, said mounting and said cam member relative to said retractor member.

14. In an apparatus for forming a closed loop of a length of tape extending through a transverse slot of a buckle with branches of the tape disposed on opposite sides of the buckle, the combination according to claim 1, said retractor member comprising two pivotally connected bars to the forward portions of which the said retractor fingers are joined, said forward portions being in mutually spaced relation and straddling said buckle support when the retractor member is in said forward limiting position, a pivot screw connecting said bars intermediate their respective ends, said screw being movable in the direction of the said path between forward and rear limiting positions, said retractor-actuating means being operatively connected to said screw, a cam member having an elongated forward portion extending substantially in the direction of said path, and expanded portion at the rear of said forward portion, and an intermediate cam portion, said elongated forward portion having two opposite front parallel lateral sides, said expanded portion having two opposite rear lateral sides a predetermined greater distance apart than said front lateral sides, and two rearwardly diverging lateral sides on said intermediate portion, follower means at the rear of said respective retractor bars, said respective follower means being engageable with the said lateral sides of said front, intermediate and rear portions of said cam member, a movable mounting for said cam member, a threaded rod connected to said mounting and disposed parallel to the longitudinal extent of said retractor member, two bearings slidably supporting said rod, an adjusting nut mounted on and in threaded engagement with said rod, said nut being between and engageable with both of said bearings, whereby an operative rotation of said nut will cause a longitudinal movement of said rod, said mounting and said cam member relative to said retractor member.

15. In an apparatus for forming a closed loop of a length of tape extending through a transverse slot of a buckle with branches of the tape disposed on opposite sides of the buckle, the combination of a support for said buckle, whereby said branches extend on opposite sides of said support, two tape-guide members adjacent and in spaced relation to opposite sides of said buckle support and extending rearwardly therefrom, a retractor member movable between forward and rear limiting positions along a path between said guide members and extending longitudinally of the buckle, said retractor member having two fingers positioned in planes adjacent the opposite faces of the buckle and disposed forwardly of said branches when the retractor member is in its said forward limiting position, said fingers being slidably engageable with said branches upon an operative movement of the retractor member rearwardly from said forward position to said rearward limiting position, thereby to fold said branches between said guide members, a sewing machine an overlying relation to said path and positioned for operative engagement with said tape branches when they are operatively in their respective folded-back positions, and means to actuate said retractor member and said sewing machine.

16. In an apparatus for forming a closed loop of a length of tape extending through a transverse slot of a buckle with branches of the tape disposed on opposite sides of the buckle, the combination of a support for said buckle, whereby said branches extend on opposite sides of said support, a retractor member movable between forward and rear limiting positions along a path extending longitudinally of the buckle, said retractor member having two fingers positioned in planes adjacent the opposite faces of the buckle and disposed forwardly of said branches when the retractor member is in its said forward limiting position, said fingers being slidably engageable with said branches upon an operative movement of the retractor member rearwardly from said forward position to said rearward limiting position, thereby to fold said branches rearwardly, a tape-holding member operatively movable between a projected position in engagement with the portion of said tape within said buckle slot and a retracted position out of engagement therewith, a sewing machine in overlying relation to said path and positioned for operative engagement with said tape branches when they are operatively in their respective folded-back positions, and means to actuate said retractor member, said sewing machine and said tape-holding member; said tape-holding member having a tip portion proportioned to be received in said transverse slot and for operative engagement with the foremost portion of said tape disposed within said slot, said holding member actuating means comprising means to move said latter member from said retracted position into an intermediate position within said buckle slot forwardly of said foremost tape portion, and means to actuate said member rearwardly from said intermediate position into said projected position in operative engagement with said tape.

17. In an apparatus for forming a closed loop of a length of tape extending through a transverse slot of a buckle with branches of the tape disposed on opposite sides of the buckle, the combination of a support for said buckle, whereby said branches extend on opposite sides of said support, a retractor member movable between forward and rear limiting positions along a path extending longitudinally of the buckle, said retractor member having two fingers positioned in planes adjacent the opposite faces of the buckle and disposed forwardly of said branches when the retractor member is in its said forward limiting position, said fingers being slidably engageable with said branches upon an operative movement of the retractor member rearwardly from said forward position to said rearward limiting position, thereby to fold said branches rearwardly, a tape-holding member operatively movable between a projected position in engagement with the portion of said tape within said buckle slot and a retracted position out of engagement therewith, a sewing machine in overlying relation to said path and positioned for operative engagement with said tape branches when they are operatively in their respective folded-back positions, and means to actuate said retractor member, said sewing machine and said tape-holding member; said tape-holding member having a tip portion proportioned to be received in said transverse slot and for operative engagement with the foremost portion of said tape disposed within said slot, and a mounting supporting said holding member and operatively movable therewith; said holding-member actuating means comprising a rocker arm movable between an inoperative position and projected positions, means to actuate said rocker arm, said mounting being pivotally connected to said arm, said arm being so proportioned and positioned that when it is in its said inoperative position said holding member is in its said retracted position, and when the arm is in a projected position said tip of the holder member is disposed within said buckle slot adjacent said tape, and means to actuate said holding member rearwardly into pressing engagement with said tape within said slot.

18. In an apparatus for forming a closed loop of a length of tape extending through a transverse slot of a buckle with branches of the tape disposed on opposite sides of the buckle, the combination of a support for said buckle, whereby said branches extend on opposite sides of said support, a retractor member movable between forward and rear limiting positions along a path extending longitudinally of the buckle, said retractor member having two fingers positioned in planes adjacent the opposite faces of the buckle and disposed forwardly of said branches when the retractor member is in its said forward limiting position, said fingers being slidably engageable with said branches upon an operative movement of the retractor member rearwardly from said forward position to said rearward limiting position, thereby to fold said branches rearwardly, a tape-holding member operatively movable between a projected position in engagement with the portion of said tape within said buckle slot and a retracted position out of engagement therewith, a sewing machine in overlying relation to said path and positioned for operative engagement with said tape branches when they are operatively in their respective folded-back positions, and means to actuate said retractor member, said sewing machine and said tape-holding member; said tape-holding member having a tip portion proportioned to be received in said transverse slot and for operative engagement with the foremost portion of said tape disposed within said slot, and a mounting supporting said holding member and operatively movable therewith; said holding-member actuating means comprising a rocker arm movable between an inoperative position and projected positions, means to actuate said rocker arm, said mounting being pivotally connected to said arm, said arm being so proportioned and positioned that when it is in its said inoperative position said holding member is in its said retracted position, and when the arm is in a projected position said tip of the holder member is disposed within said buckle slot adjacent said tape, yieldable means urging said holding member forwardly away from said tape within said buckle slot, and means to actuate said holding member rearwardly against the action of said yieldable means into pressing engagement with said tape within said slot.

19. In an apparatus for forming a closed loop of a length of tape extending through a transverse slot of a buckle with branches of the tape disposed on opposite sides of the buckle, the combination of a support for said buckle, whereby said branches extend on opposite sides of said support, a retractor member movable between forward and rear limiting positions along a path extending longitudinally of the buckle, said retractor member having two fingers positioned in planes adjacent the opposite faces of the buckle and disposed forwardly of said branches when the retractor member is in its said forward limiting position, said fingers being slidably engageable with said branches upon an operative movement of the retractor member rearwardly from said forward position to said rearward limiting position, thereby to fold said branches rearwardly, a tape-holding member operatively movable between a projected position in engagement with the portion of said tape within said buckle slot and a retracted position out of engagement therewith, a sewing machine in overlying relation to said path and positioned for operative engagement with said tape branches when they are operatively in their respective folded-back positions, and means to actuate said retractor member, said sewing machine and said tape-holding member; said tape-holding member having a tip portion proportioned to be received in said transverse slot and for operative engagement with the foremost portion of said tape disposed within said slot, and a mounting supporting said holding member and operatively movable therewith; said holding-member actuating means comprising a rocker arm movable between an inoperative position and projected positions, said projected positions comprising an intermediate position and an operative limiting position; means to actuate said rocker arm; said mounting being pivotally connected to said arm, said arm being so proportioned and positioned that when it is in its said inoperative position said holding member is in its said retracted position, and when the arm is in its said intermediate position said holding-member tip is disposed within said buckle slot and spaced forwardly from said tape within the buckle, said mounting having a lip thereon, a stop member spaced from the pivotal connection between said rocker arm and mounting, said stop member being spaced from said lip when said rocker arm is in its said intermediate position and engageable with said lip when the rocker arm is in its said operative limiting position, whereby upon an operative engagement between said stop member and said lip said holding member will be rotatably actuated rearwardly into its said projected position against said tape.

20. In an apparatus for forming a closed loop of a length of tape extending through a transverse slot of a buckle with branches of the tape disposed on opposite sides of the buckle, the combination of a support for said buckle, whereby said branches extend on opposite sides of said support, a retractor member movable between forward and rear limiting positions along a path extending longitudinally of the buckle, said retractor member having two fingers positioned in planes adjacent the opposite faces of the buckle and disposed forwardly of said branches when the retractor member is in its said forward limiting position, said fingers being slidably engageable with said branches upon an operative movement of the retractor member rearwardly from said forward position to said rearward limiting position, thereby to fold said branches rearwardly, a tape-holding member operatively movable between a projected position in engagement with the portion of said tape within said buckle slot and a retracted position out of engagement therewith, a sewing machine in overlying relation to said path and positioned for operative engagement with said tape branches when they are operatively in their respective folded-back positions, and means to actuate said retractor member, said sewing machine and said tape-holding member; said tape-holding member having a tip portion proportioned to be received in said transverse slot and for operative engagement with the foremost portion of said tape disposed within said slot, and a mounting supporting said holding member and operatively movable therewith; said holding-member actuating means comprising a rocker arm movable between an inoperative position and projected positions, said projected positions comprising an intermediate position and an operative limiting position; means to actuate said rocker arm; said mounting being pivotally connected to said arm, said arm being so proportioned and positioned that when it is in its said inoperative position said holding member is in its said retracted position, and when the arm is in its said intermediate position said holding-member tip is disposed within said buckle slot and spaced forwardly from said tape within the buckle, said mounting having a lip thereon, a stop member spaced from the pivotal connection between said rocker arm and mounting, said stop member being spaced from said lip when said rocker arm is in its said intermediate position and engageable with said lip when the rocker arm is in its said operative limiting position, whereby upon an operative engagement between said stop member and said lip said holding member will be rotatably actuated rearwardly into its said projected position against said tape, a roller supported by said mounting, and a stationary cam member proportioned for engagement with said roller during the operative movement of said mounting.

21. In an apparatus for forming a closed loop of a length of tape extending through a transverse slot of a buckle with branches of the tape disposed on opposite sides of the buckle, the combination of a support for said buckle, whereby said branches extend on opposite sides of said support, a retractor member movable between forward and rear limiting positions along a path extending longitudinally of the buckle, said retractor member having two fingers positioned in planes adjacent the opposite faces of the buckle and disposed forwardly of said branches when the retractor member is in its said forward limiting position, said fingers being slidably engageable with said branches upon an operative movement of the retractor member rearwardly from said forward position to said rearward limiting position, thereby to fold said branches rearwardly, a tape-holding member operatively movable between a projected position in engagement with the portion of said tape within said buckle slot and a retracted position out of engagement therewith, a sewing machine in overlying relation to said path and positioned for operative engagement with said tape branches when they are operatively in their respective folded-back positions, and means to actuate said retractor member, said sewing machine and said tape-holding member; said tape-holding member having a tip portion proportioned to be received in said transverse slot and for operative engagement with the foremost portion of said tape disposed within said slot, and a mounting supporting said holding member and operatively movable therewith; said holding-member actuating means comprising a rocker arm movable between an inoperative position and projected positions, means to actuate said rocker arm, said mounting being pivotally connected to said arm, said arm being so proportioned and positioned that when it is in its said inoperative position said holding member is in its said retracted position, and when the arm is in a projected position said tip of the holder member is disposed within said buckle slot adjacent said tape, said rocker arm having joined thereto a second arm in bellcrank configuration, a spring connecting said second arm and said holding member and urging the latter forwardly away from said tape within said buckle slot, and means to actuate said holding member rearwardly against the action of said yieldable means into pressing engagement with said tape within said slot.

22. In an apparatus for forming a closed loop of a length of tape extending through a transverse slot of a buckle with branches of the tape disposed on opposite sides of the buckle, the combination according to claim 1, said sewing-machine actuating means comprising a cam shaft, means to actuate the shaft, two adjacent cams with peripheral operating surfaces, said cams being rotatably adjustable about said shaft, fastening means to releasably hold said cams in selected relative positions on said shaft, a follower operatively engageable with the operating surfaces of both of said cams, a switch coactively associated with said sewing machine, and connecting means between said follower and said switch.

References Cited in the file of this patent

UNITED STATES PATENTS

| | | |
|---|---|---|
| 2,715,984 | Brownstein | Aug. 23, 1955 |
| 2,770,204 | Brownstein | Nov. 13, 1956 |